No. 898,022. PATENTED SEPT. 8, 1908.
C. A. TRIPP.
FLUID PRESSURE BRAKE.
APPLICATION FILED APR. 29, 1908.
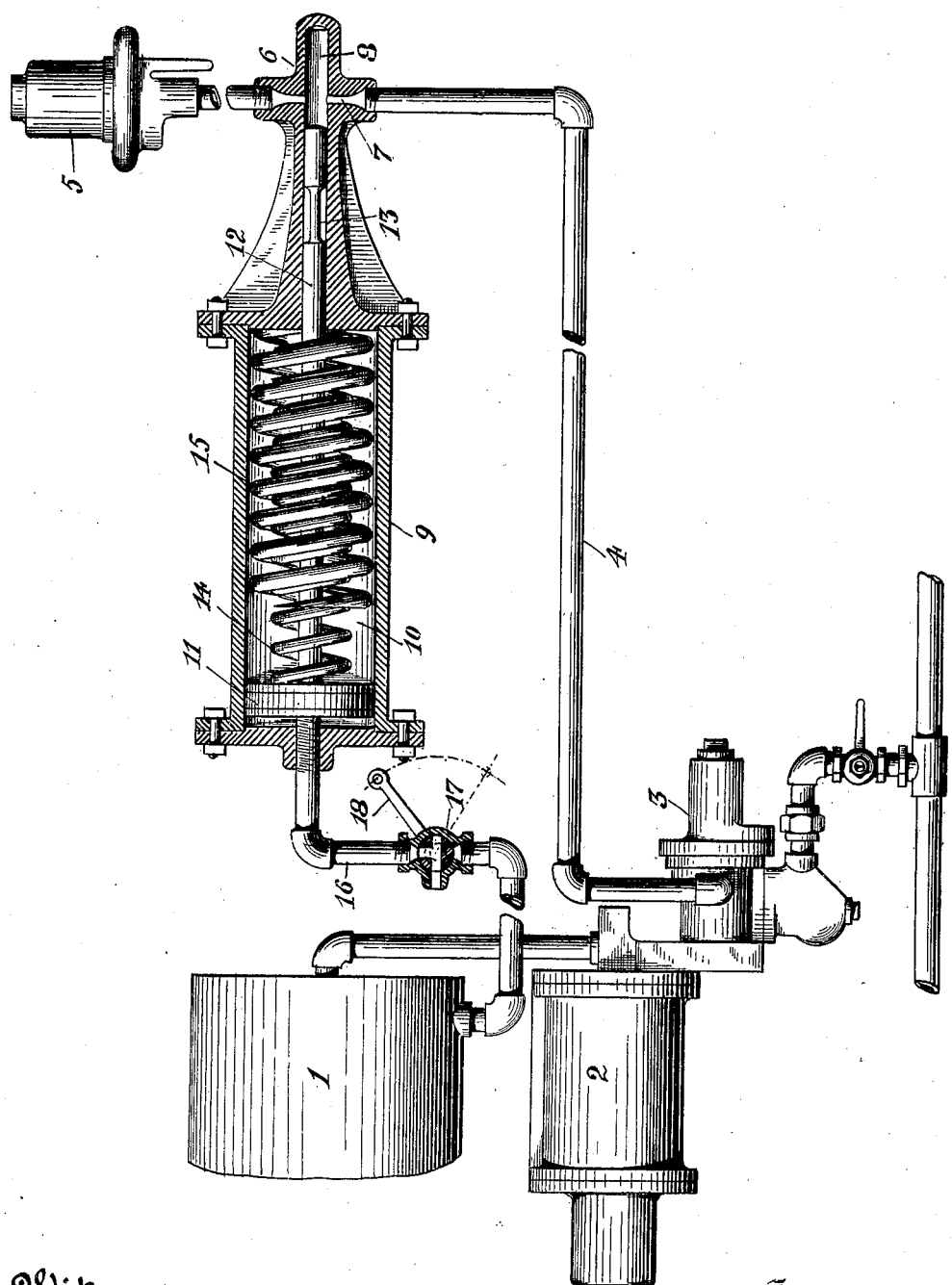
Witnesses.
Inventor,
Clarence A. Tripp,
By
Attorney.

UNITED STATES PATENT OFFICE.

CLARENCE A. TRIPP, OF LOS ANGELES, CALIFORNIA.

FLUID-PRESSURE BRAKE.

No. 898,022.  Specification of Letters Patent.  Patented Sept. 8, 1908.

Application filed April 29, 1908. Serial No. 429,806.

*To all whom it may concern:*

Be it known that I, CLARENCE A. TRIPP, a citizen of the United States, residing in Los Angeles, county of Los Angeles, and State of California, have invented new and useful Improvements in Fluid-Pressure Brakes, of which the following is a specification.

My invention relates to means for controlling the exhaust from the triple valve, and the object thereof is to provide a device in which the primary operation will be to close the exhaust from the triple valve and when the pressure rises to a predetermined point the exhaust from the triple valve will be opened. I accomplish this object by the mechanism described herein and illustrated in the accompanying drawings which show a side elevation of the triple valve and other parts of the ordinary brake apparatus with my exhaust controller in central longitudinal section.

In the drawings 1 is the ordinary auxiliary reservoir, 2 is the brake cylinder, and 3 the triple valve, 4 is the triple valve exhaust pipe and 5 is the ordinary pressure retaining valve which is used on freight cars of any standard pressure brake mechanism, which parts are placed in the usual position on the cars.

In the brake apparatus now in general use it requires the assistance of train men to hold the brakes set when it is desired to recharge the auxiliary reservoir on heavy grades. In order to relieve the train men from the necessity of looking after the apparatus so as to retain the brakes in operative position while the auxiliary reservoir is being recharged I provide the exhaust pipe from the triple valve with a valve casing 6 which has a transverse bore 7 therein which registers with the opening through the exhaust pipe. Said casing also has a longitudinal bore 8 extending at right angles to bore 7 and crossing the same. To the valve casing is secured the piston chamber casing 9, which together with the valve casing forms a piston chamber 10. In this piston chamber is mounted a piston 11 which has a stem 12 that passes into the bore 8 of the valve casing and the outer end thereof forms the valve stopper of the valve. Near the outer end of this valve stopper it is reduced as shown at 13. Within the piston chamber and mounted on the piston stem is a light coiled spring 14 which when the device is in its inoperative position holds the piston furthest away from the valve casing as shown in the drawing, one end of said spring bearing against the piston and the other end bearing against the valve casing. Within said valve casing and surrounding said light coiled spring is a shorter coiled spring 15 which has a resistance equal to the pressure of the auxiliary reservoir required for the braking power desired. The inner end of valve chamber 10 is connected by pipe 16 with the auxiliary reservoir. On this connection is a three-way valve 17 which is adapted to connect chamber 10 to pressure or exhaust as desired. This valve is operated by handle 18.

In the usual management of the train cock 17 would connect chamber 10 to exhaust as shown in the drawings, and the pressure retaining valve would be operated in the usual manner. When the train, however, came to a heavy grade, cock 17 would be turned to throw chamber 10 to pressure, the first traverse of the piston would cause piston stem 12 to move so as to cut off the exhaust from the triple and the brakes could not be thereafter released until the pressure in the auxiliary reservoir was raised to a point of pressure that would compress spring 15 when the further traverse of the piston would bring the reduced portion of the piston stem 14 into register with the transverse bore 7, when the exhaust from the brake cylinder would be accomplished in the usual manner.

By this construction it will be seen that the engineer can always keep the pressure in his auxiliary reservoir up to the maximum braking power as the brakes cannot be released until such pressure has been exceeded in the auxiliary reservoir because until the pressure moves the piston to carry the reduced portion of the piston stem into register with the transverse bore of the valve on the exhaust pipe from the triple, the air cannot escape and so release the brakes. As soon as the heavy grades have been passed over cock 17 is turned to throw the piston chamber to exhaust and the train is then operable in the usual manner.

If desired the pressure retaining valve could be omitted but its use is preferred as it is only necessary to use my device where heavy grades are to be passed over.

Having described my invention what I claim is;

1. In a fluid brake system means for automatically closing the exhaust from the triple valve by fluid pressure when such pressure is below a predetermined point, and for opening the exhaust when the pressure rises above such point.

2. In a fluid brake system, fluid pressure operated means for closing the exhaust from the triple valve when the fluid pressure is below a predetermined point and for opening the exhaust when the pressure rises above such point.

3. In a fluid pressure brake system, the combination with the auxiliary reservoir, brake cylinder, and triple valve, of fluid pressure operated means for cutting off the exhaust from the triple valve when the fluid pressure is below a predetermined point; and for opening the exhaust when the fluid pressure is above such point.

4. In a fluid brake system the combination of an auxiliary reservoir, brake cylinder, triple valve and pressure retaining valve, with a valve on the connection between the pressure retaining valve and the triple valve; fluid pressure operated means connected to said valve for closing the valve on the connection between the pressure regulating valve and triple valve when the fluid pressure is below a predetermined point and for opening said valve when the pressure rises above such predetermined point.

5. In a fluid brake system an auxiliary reservoir, a brake cylinder; a triple valve; a pressure retaining valve; connections between said parts; a valve on the connection between the pressure retaining valve and the triple valve; a piston chamber having the casing thereof connected to said valve casing; a piston in said chamber having a stem extending into the casing of the valve and forming the stopper of said valve, said stopper being reduced in size near the end thereof; two springs in said piston chamber on said stem, one of said springs being lighter and longer than the other; a connection from said piston chamber to the auxiliary reservoir; a three-way valve on said connection.

In witness that I claim the foregoing I have hereunto subscribed my name this 16th day of April, 1908.

CLARENCE A. TRIPP.

Witnesses:
G. E. HARPHAM,
S. B. AUSTIN.